Figure 1:
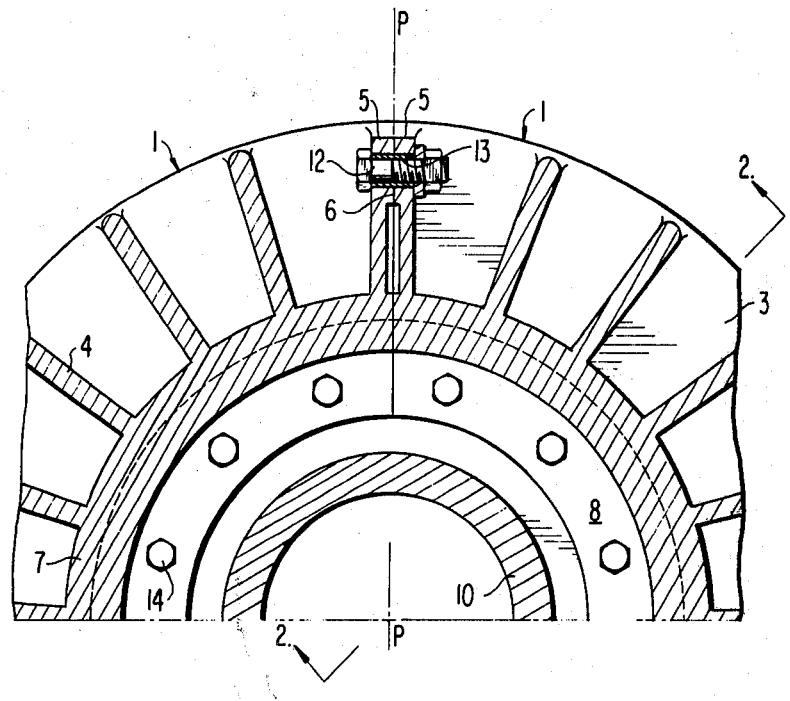

United States Patent [19]

Simon

[11] 4,002,227
[45] Jan. 11, 1977

[54] BRAKE DISC ASSEMBLY

[75] Inventor: Pierre Simon, Pont-a-Mousson, France

[73] Assignee: Pont-a-Mousson S.A., Nancy, France

[22] Filed: Oct. 8, 1975

[21] Appl. No.: 620,681

[30] Foreign Application Priority Data

Oct. 11, 1974 France .................... 74.34224

[52] U.S. Cl. ...................................... 188/218 X L
[51] Int. Cl.² ........................................ F16D 65/12
[58] Field of Search ............ 188/18 A, 73.1, 73.2, 188/218 X L; 192/107 R

[56] References Cited

UNITED STATES PATENTS

| | | | |
|---|---|---|---|
| 2,243,334 | 5/1941 | Eksergian | 188/218 X L |
| 2,255,023 | 9/1941 | Eksergian | 188/218 X L |
| 2,765,881 | 10/1956 | Pierce | 188/218 X L |
| 2,769,512 | 11/1956 | Tack | 188/218 X L |
| 3,892,297 | 7/1975 | Brownyer | 188/218 X L |

*Primary Examiner*—Duane A. Reger
*Attorney, Agent, or Firm*—Sughrue, Rothwell, Mion, Zinn & Macpeak

[57] ABSTRACT

A brake disc comprises two flat, parallel friction rings interconnected by radial and axial ribs, with each ring being formed by at least two joined sectors. A circular flange extends radially inwardly from the rings and has a shoulder for receiving the lip of a flexible cylindrical web extending concentrically back from one end of a central hub. The flange and lip are secured together by a plurality of screws which bear the braking forces, while the flexibility of the web accommodates radial expansions due to the heating of the friction rings.

5 Claims, 2 Drawing Figures

U.S. Patent  Jan. 11, 1977  4,002,227

BRAKE DISC ASSEMBLY

The present invention relates to a disc for a disc brake of the type comprising a hub which is in use secured so as to rotate with a part to be braked and a braking arrangement that is connected to the hub and is constituted by two parallel friction rings interconnected by radial ribs, the braking arrangement being divided in the circumferential direction into a plurality of sectors having interconnected end ribs.

Discs of this type are already known, in particular from French Pat. No. 73.21 539, in which the means for connecting the braking arrangement and hub are constituted by radial arms extending from the hub which are secured by screws between the end ribs of adjacent sectors. The screws leave a certain radial clearance which facilitates radial and axial sliding of the sectors. Other radial arms extending from the hub are also introduced between the two friction rings, but without being screwed to the rings, in order to ensure the axial and radial centering of the latter.

Discs of this type have numerous drawbacks, amongst which is the fact that the braking torque is transmitted to the hub solely by for example two radial arms which are subject to bending stresses and can as a result rupture. Furthermore, owing to the presence of connecting arms of the hub between the end ribs of adjacent sectors, a certain circumferential clearance appears between the ends of these adjacent sectors, which causes abnormal wear of the friction linings of the brake at the time of braking. In addition, as the friction rings heat up during braking, these rings expand with respect to the hub and to its arms such that the centering arms no longer fulfil their centering function, above all in the radial direction, and this causes slipping of the surfaces of the arms screwed to the surfaces of the end ribs of adjacent sectors, this slipping necessitating treatment of these surfaces to prevent wear of the latter.

An object of the present invention is to remedy these drawbacks.

The present invention provides a disc for a disc brake of the type comprising a hub which is in use secured so as to rotate with a part to be braked and a braking arrangement that is connected to the hub and is constituted by two parallel friction rings interconnected by radial ribs, the braking arrangement being divided in the circumferential direction into a plurality of sectors having interconnected end ribs, wherein means are provided for connecting the braking assembly and the hub, which means are constituted by a member secured to each sector and provided with means for engaging under an inner circumferential surface of the hub, and by means for securing the said member to the hub.

In a particularly advantageous arrangement, the adjacent end ribs of two adjacent sectors bear directly one against the other.

It is thus possible to eliminate any clearance between the ends of the sectors and to have continuous centering of the sectors on the hub even when the friction rings are heated at the time of braking.

Figure 2:
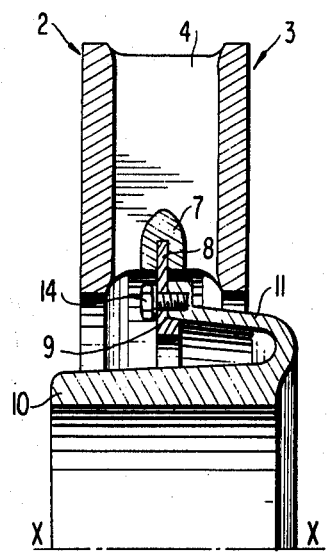

Further features and advantages of the invention will become apparent from the ensuing description given as a non-limiting example and with reference to the accompanying drawings, in which:

FIG. 1 is a partial view in section along the axis of a disc according to the invention; and FIG. 2 is a sectional view on the line 2—2 of FIG. 1.

The disc illustrated in FIGS. 1 and 2 has an axis X—X and comprises a braking assembly of cast iron and a steel hub. The braking assembly is formed by two annular sectors 1 which are juxtaposed along radial junction planes P. Seen along such a plane, the arrangement of these sectors constitutes two annular plates or rings 2 and 3 (each constituted by two sectors of a ring) which are disposed parallel to each other and are connected by ribs or spacer members 4 directed along axial radial planes. These ribs 4 are distributed regularly around the circumference of the disc and there is also a rib 5 of special shape at both circumferential ends of each sector 1. These ribs 5 have a surface 6, referred to as an outer surface, disposed exactly along the junction plane P.

Each sector 1 comprises a radial and circumferential rib 7 connecting the inner parts of the ribs 4 between the rings 2 and 3. Housed in a circumferential and inner radial groove in the ribs 7 of the various sectors is a common steel flange 8. The flange 8 projects inwards with respect to the rib 7 and comprises a circumferential shoulder 9 which is directed towards the outside of the disc.

The steel hub 10, which is virtually cylindrical, is integral with a substantially cylindrical web or flange 11 which is coaxial to the hub 10, but flares out slightly to form a lip from an axial end of the hub. The thickness of the flange 11 is sufficiently small to ensure adequate strength and yet to be elastically deformable in the radial direction.

Whereas for each sector the assembly of rings 2 and 3, ribs 4, 5 and 7 is rough cast, the outer surfaces 6 of the ribs 5 and the end surfaces of the sectors 1 which are disposed along the same plane are machined before mounting in order to be able to bear against each other exactly, at the time of mounting. The means for interconnecting the sectors are constituted by bolts 12 passing through the end ribs 5 of adjacent sectors, a socket 13 surrounding each bolt 12 in order to serve for positioning adjacent sectors. The connection between the sectors 1 and the hub 10 is produced by hooking the end of the flange 11 of the hub on the lip of shoulder 9 of the flange 8 and securing the flange 11 to the flange 8 by screws 14 distributed circumferentially. The screws 14 could be replaced by bolts or studs for example.

In this assembly, the braking torque produced by clamping two friction linings on the faces of the friction rings 2 and 3 constituted by the two annular sectors assembled by bolts 12, is transmitted by the screws 14 to the hub 10 which is in used keyed on an axle which it is desired to brake. During heating of the friction rings 2 and 3, the dimensional variations of these rings are compensated for by elastic deformations of the flange 11 of the hub which directly receives the radial forces due to expansion, these radial forces being transmitted to the flange 11 by the shoulder 9 of the flange 8.

When it is desired to change the friction rings 2 and 3, it is sufficient to unfasten the screws 14 to disassemble the sectors and hub, and then to unscrew the bolts 12 for disassembling the sectors. The reverse operation facilitates re-mounting of new rings 2 and 3 on the hub 10, which is retained.

This type of assembly is particularly simple, reliable and effective, allowing easy and rapid mounting of the disc assembly and in particular replacement of the friction rings.

Furthermore, this assembly allows the disc the possiblility of expanding freely, but nevertheless preventing the sectors from sliding with respect to each other. On the one hand, contact of the sectors is maintained constantly, without the presence of any clearance between the latter, since their end ribs are clamped directly by bolts 12. Their connection is also completed by their attachment to the flange 8 common to the sectors. On the other hand, expansions due to heating of the friction rings 2 and 3 are easily absorbed by the elastic flange 11 which ensures perfect and constant centering whatever the expansion of the rings 2 and 3, owing to the hooking of the flange 11 on the shoulder 9 of the flange 8. Transmission of the braking torque over the entire periphery of the flange 11 by the screws 14 finally allows a high torque without any risk of rupture.

Naturally, whereas in the example described above, the disc comprises two semi-circular sectors, it is possible to provide a disc with more than two sectors connected to each other and to the hub.

I claim:

1. A brake disc and hub assembly, comprising:
   a. a cylindrical hub adapted to be secured to a wheel, axle or the like to be braked,
   b. a flexible cylindrical web integral with the hub and extending back over a portion of the hub from one end thereof in a concentric manner,
   c. a circular lip provided on an inner end of said web and being defined by an out-turned peripheral edge thereof,
   d. two axially spaced, planar, parallel friction rings interconnected by a plurality of radial ribs, said interconnected rings being circumferentially divided into at least two joined circular sectors,
   e. a generally planar, ring-like flange secured between said interconnected rings, being parallel thereto, and extending radially inwardly therefrom, said flange being similarly divided into at least two circular sectors,
   f. a circular shoulder adjacent the inner periphery of said flange and defined by an axially extending lip thereon, said shoulder mating with and accommodating said web lip, and
   g. a plurality of screws securing said mated web and flange together.

2. An assembly according to claim 1, wherein the web has a reduced thickness as compared with the hub, whereby it is elastically deformable in the radial direction.

3. An assembly according to claim 2, wherein the flange projects from an inner circumferential rib extending between and connecting the radial ribs of each sector.

4. An assembly according to claim 1, wherein the radial ribs at the ends of two adjacent sectors bear directly against each other.

5. An assembly according to claim 4, wherein said end radial ribs of the adjacent sectors are secured to each other by screws.

* * * * *